United States Patent [19]
Abe et al.

[11] Patent Number: 5,733,833
[45] Date of Patent: Mar. 31, 1998

[54] SEMICONDUCTIVE CERAMIC

[75] Inventors: Yoshiaki Abe; Takahiko Kawahara, both of Yokaichi; Yasuhiro Nabika; Norimitsu Kito, both of Omihachiman; Ryoichi Urahara, Yokaichi, all of Japan

[73] Assignee: Murata Manufacturing Co., Ltd., Kyoto-fu, Japan

[21] Appl. No.: 775,004

[22] Filed: Dec. 27, 1996

[51] Int. Cl.$^6$ ........................................... C04B 6/97
[52] U.S. Cl. ............................................ 501/137; 501/138
[58] Field of Search ............................ 501/135, 138, 501/137

[56] References Cited

U.S. PATENT DOCUMENTS

| | | | |
|---|---|---|---|
| 4,861,736 | 8/1989 | Ono et al. | 501/138 |
| 4,863,883 | 9/1989 | Menashi et al. | 501/138 |
| 5,532,197 | 7/1996 | Kim et al. | 501/138 |
| 5,604,167 | 2/1997 | Wilson et al. | 501/138 |

*Primary Examiner*—Deborah Jones
*Attorney, Agent, or Firm*—Ostrolenk, Faber, Gerb & Soffen, LLP

[57] ABSTRACT

A semiconducting ceramic whose rush breakdown voltage is high and which hardly cracks during lamination is provided. In the semiconducting ceramic having a positive resistance-temperature characteristic, the ratio of intra-granular resistance of the crystal grains and inter-granular resistance between crystal grains which together determine the value of resistance of the semiconducting ceramic is set so that the intra-granular resistance is less than about 20% of the value of resistance of the semiconducting ceramic (not including 0%).

4 Claims, 2 Drawing Sheets

RATIO OF INTRA-GRANULAR RESISTANCE/%

SEMICONDUCTIVE CERAMIC

BACKGROUND OF THE INVENTION

The present invention relates to a semiconductive ceramic having a positive resistance-temperature characteristic.

DESCRIPTION OF RELATED ART

When a conventional barium titanate semiconductive ceramic having a positive resistance-temperature characteristic is energized, an initial current flows through the semiconducting ceramic, increasing the temperature as well as the resistance of the semiconducting ceramic. As the resistance thereof increases, the current flowing through the semiconducting ceramic is reduced. Utilizing this positive resistance-temperature characteristic, such a semiconducting ceramic is used in a current control circuit for actuating a motor such as a compressor, for demagnetizing a color display and the like or for preventing an over-current of the motor and the like.

However, such semiconductive ceramics have had a problem in that when a voltage is applied to the semiconducting ceramic, a large amount of current flows through the semiconducting ceramic because the resistance of the semiconducting ceramic is low at the time when the voltage is first applied, thus causing the phenomenon that the semiconducting ceramic lamination becomes cracked, for example, and is destroyed (hereinafter referred to as a rush breakdown voltage).

As a result of zealous endeavors to raise the rush breakdown voltage in the semiconducting ceramic, i.e. to increase the yield strength of the semiconducting ceramic against laminar destruction, the inventors of the present application have found that the rush breakdown voltage may be raised by specifically setting the ratio of intra-granular resistance and inter-granular resistance which together compose the value of resistance of the semiconducting ceramic. It is noted that the intra-granular resistance of the semiconducting ceramic means the resistance intrinsic to the ceramic crystal grains composing the semiconducting ceramic and the inter-granular resistance means a resistance between ceramic crystal grains.

Accordingly, it is an object of the present invention to solve the aforementioned problem by providing semiconductive ceramic whose rush breakdown voltage is high and which hardly cracks in lamination.

SUMMARY OF THE INVENTION

In order to achieve the aforementioned object, the amount of an intra-granular resistance of the crystal grain and inter-granular resistance between crystal grains which together determine the value of resistance of the semiconducting ceramic having a positive resistance-temperature characteristic is set so that the intra-granular resistance is less than about 20% of the total value of resistance of the semiconducting ceramic (not including 0%) and preferably less than about 17%.

The ratio can be adjusted by selection of the ceramic and the conditions used to form or process it. Appropriate parameters can be determined by conducting a few simple and routine procedures and determining the ratio achieved.

Further, the semiconducting ceramic having the positive resistance-temperature characteristic is composed of a barium titanate semiconducting ceramic.

The barium titanate semiconducting ceramic is mainly composed of barium titanate containing oxides of rare earth elements such as niobium, antimony, yttrium, lanthanum and cerium, i.e. semiconducting agents. Beside that, there also can be used ceramics in which part of barium is replaced by lead, strontium or calcium and in which part of titanium is replaced by tin or zirconium. Further, there are ceramics which contains manganese oxide and silicon dioxide which can be employed.

Thereby, the composition of the intra-granular resistance and the inter-granular resistance of the semiconducting ceramic is suppressed within a predetermined range, thus raising the rush breakdown voltage of the semiconducting ceramic.

DESCRIPTION OF PREFERRED EMBODIMENTS

Figure 1:
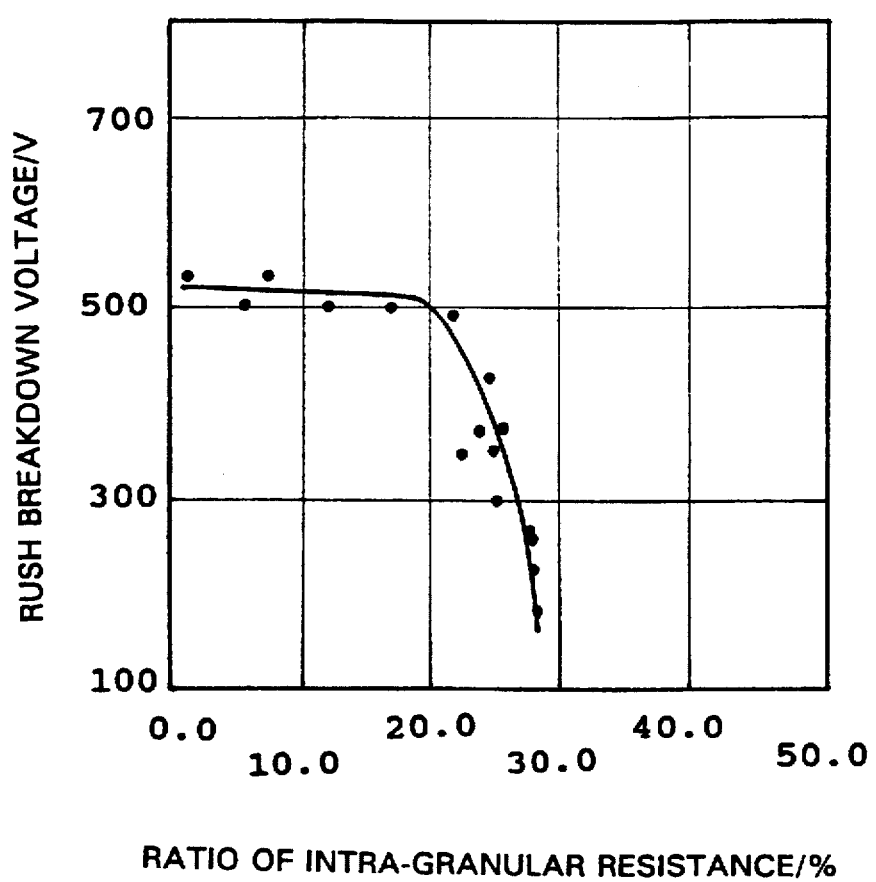
FIG. 1 is a graph showing the relationship between the ratio of the intra-granular resistance (%) and the rush breakdown voltage (V) according to the first embodiment.

The specific nature and advantage of the invention will clearly appear from the following description.

FIRST EMBODIMENT

At first, starting raw materials of $BaCO_3$, $SrCO_3$, $PbO_4$, $CaCO_3$, $TiO_2$, $Er_2CO_3$, $MnCO_3$ and $SiO_2$ are blended in a predetermined ratio. Distilled water is added to the blended raw material and is blended wet in a ball mill. Then, the mud-like blend is dehydrated and dried. Next, the dried raw material is calcinated for two hours at 1150° C. and is crushed in the ball mill to obtain a calcinated powder. Then, a polyvinyl alcohol aqueous solution is added as a binder to the calcinated powder to effect granulation and obtain a ceramic powder raw material whose composition may be represented as $(Ba_{0.687}Pb_{0.06}Sr_{0.15}Ca_{0.10}Er_{0.0035})$ $TiO_3$ + 0.0006 Mn+0.003 $SiO_2$.

This ceramic raw material is molded by using a drying press to obtain five disk-like compacts having an outer diameter of 18 mm and a thickness of 2.8 mm.

The compacts are sintered by being placed at different positions in the same oven for two hours at 1340° C. They are then cooled at a rate of 10° C./min. from 1340° C. to 1100° C., at a rate of 0.5° C./min. from 1100° C. to 900° C. and at a rate of 10° C./min. from 900° C. to room temperature to obtain a positive characteristic thermistor element. An electrode having an ohmic contact is formed on the main surface of the positive characteristic thermistor element to obtain a ceramic semiconductor whose Curie temperature is 60° C. and whose value of resistance at ambient temperature is 4.5Ω.

The value of resistance of the semiconducting ceramic is measured by means of the complex impedance method to divide it into an intra-granular resistance and an inter-granular resistance in order to find the percentage ratio of the intra-granular resistance within the value of resistance of the semiconducting ceramic (=intra-granular resistance/(intra-granular resistance+inter-granular resistance)×100). Further, the rush breakdown voltage of the semiconducting ceramic is measured. The results thereof are listed in Table 1.

FIRST COMPARISON EXAMPLE

The same ceramic powder raw material as that in the first embodiment described above is used and is molded by using the drying press to obtain a disk-like compact having an outer diameter of 18 mm and a thickness of 2.8 mm. This compact is sintered for two hours at 1340° C. Then, it is cooled at a rate of 3° C./min. from 1340° C. to room temperature in the cooling process to obtain a positive characteristic thermistor element. An electrode having an ohmic contact is formed on the main surface of the positive characteristic thermistor element to obtain a ceramic semiconductor whose Curie temperature is 60° C. and whose value of resistance at ambient temperature is 4.5Ω. Then, the value of resistance of the semiconducting ceramic is measured in the same manner as with the first embodiment to find the ratio of the intra-granular resistance within the value of resistance of the semiconducting ceramic and rush breakdown voltage. The measured values are listed also in Table 1.

TABLE 1

| Sample No. | Ratio of Intra-Granular Resistance (%) | Rush Breakdown Voltage (V) |
| --- | --- | --- |
| First Embodiment - 1 | 7.5 | 530 |
| First Embodiment - 2 | 17.1 | 500 |
| First Embodiment - 3 | 5.7 | 500 |
| First Embodiment - 4 | 12.1 | 500 |
| First Embodiment - 5 | 1.4 | 530 |
| First Comparison Example | 27.6 | 250 |

As it is apparent from Table 1, the values are stable in the first embodiment. That is, the ratio of the intra-granular resistance to the value of resistance of the semiconducting ceramic is less than 20% and the rush breakdown voltage is 500 to 530 V. Contrary to that, the ratio of the intra-granular resistance to the value of resistance of the semiconducting ceramic is 27.6% and the rush breakdown voltage is 250 V, i.e. lower than those in the first embodiment, in the First Comparison Example.

FIG. 1 is a graph plotting the data shown in Table 1. The data obtained in other comparison examples are also incorporated into the graph shown in FIG. 1. As is apparent from FIG. 1, in the case where the ratio of the intra-granular resistance exceeds to about 20%, the rush breakdown voltage abruptly decreases. Since the intra-granular resistance is the resistance instrinsic to the ceramic crystal grains, it is thought that the ratio of the intragranular resistance relates to the grain size of the ceramic crystalline of the semiconductive ceramic. Thus, the ratio of intra-granular resistance can be controlled by adjusting the cooling rate in the duration when the ceramic crystallines of the semiconductive ceramic are growing.

SECOND EMBODIMENT

A semiconducting ceramic is created in the same manner with the first embodiment described above. However, in the second embodiment, the ratio of $Pb_3O_4$, i.e. one of the starting raw materials, is increased as compared to that in the first embodiment to obtain the semiconducting ceramic whose composition may be represented as

$(Ba_{0.687}Pb_{0.10}Sr_{0.05}Ca_{0.10}Er_{0.0035})TiO_3+0.0006\ Mn+0.003\ SiO_2$, whose Curie temperature is 120° C. and whose value of resistance at ambient temperature is 16Ω.

The value of resistance of the semiconducting ceramic of this evaluation sample is measured in the same manner with the first embodiment to find the ratio of the intra-granular resistance to the value of resistance of the semiconducting ceramic and the rush breakdown voltage. The result is listed in Table 2.

SECOND COMPARISON EXAMPLE

The same ceramic powder raw material as that in the second embodiment described above is used and is sintered under the same conditions as that in the first embodiment to obtain semiconducting ceramics whose Curie temperature is 120° C. and whose value of resistance at ambient temperature is 16Ω. Then, the ratio of the intra-granular resistance to the value of resistance of the semiconducting ceramic and rush breakdown voltage are measured in the same manner with the first embodiment. The measured values are listed also in Table 2.

TABLE 2

| Sample No. | Ratio of Intra-Granular Resistance (%) | Rush Breakdown Voltage (V) |
| --- | --- | --- |
| Second Embodiment 1 | 15.4 | 615 |
| Second Embodiment 2 | 1.5 | 615 |
| Second Embodiment 3 | 5.5 | 640 |
| Second Embodiment 4 | 9.4 | 615 |
| Second Comparison Example | 27.5 | 415 |

Figure 2:
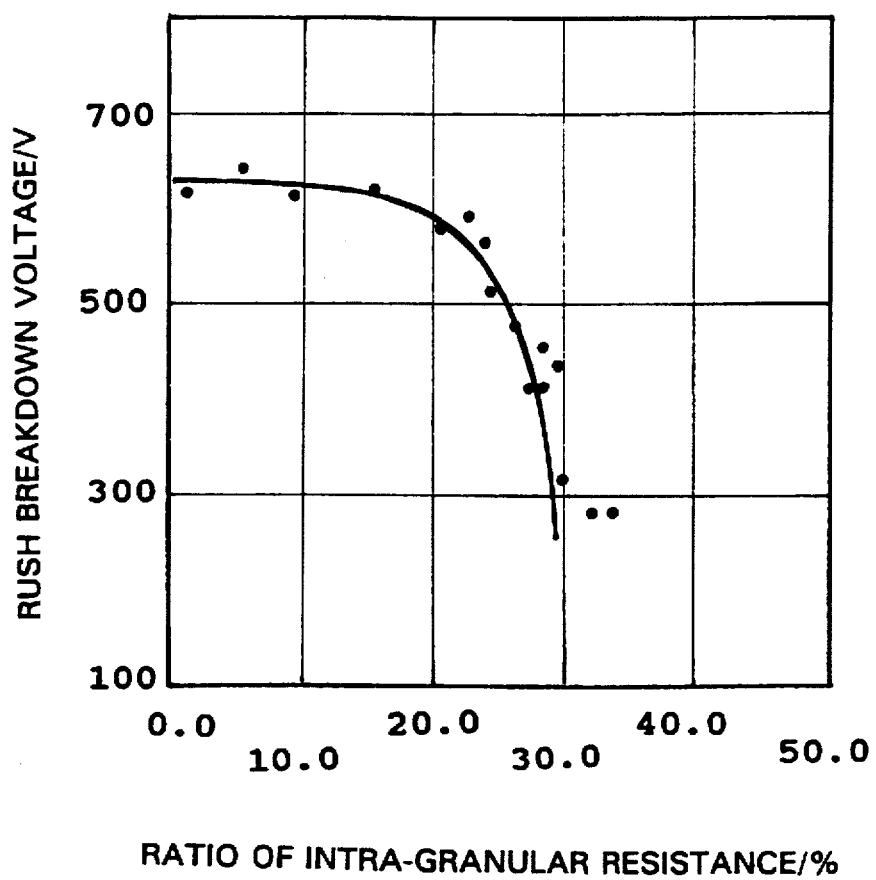
FIG. 2 is a graph showing the relationship between the ratio of the intra-granular resistance (%) and the rush breakdown voltage (V) according to the second embodiment.

As is apparent from Table 2, the ratio of the intra-granular resistance value of the resistance of the semiconductive ceramic is less than 20% and the rush breakdown voltage is 615 to 540 V. Contrary to that, the ratio of the intra-granular resistance within the value of resistance of the semiconductive ceramic is 27.5% and the rush breakdown voltage is 415 V, i.e., lower than those in the second embodiment, in the Second Comparison Example. FIG. 2 is a graph plotting the data shown in Table 2. The data obtained in other comparison examples are also incorporated into the graph shown in FIG. 2. As is apparent from FIG. 2, in the case where the ratio of the intra-granular resistance exceeds to about 20%, the rush breakdown voltage abruptly decreases.

As described above, the rush breakdown voltage is raised and laminar cracking hardly occurs in the inventive semiconducting ceramic by controlling the amount of the intra-granular resistance within the value of resistance of the semiconducting ceramic to be less than about 20%.

While preferred embodiments have been described, variations thereto will occur to those skilled in the art within the scope of the present inventive concepts which are delineated by the following claims.

What is claimed is:

1. A barium titante semiconducting ceramic having a positive rush breakdown voltage wherein the amounts of an intra-granular resistance of the crystal grains and inter-granular resistance between crystal grains which together determine the value of total resistance of said semiconducting ceramic is such that said intra-granular resistance has positive value which is less than about 20% of said value of total resistance of said semiconducting ceramic.

2. The semiconducting ceramic according to claim 1, wherein said intra-granular resistance has positive value which is less than about 17% of said value of total resistance of said semiconducting ceramic.

3. In an electrical device containing a semiconducting ceramic having a positive rush breakdown voltage, the improvement which comprises said ceramic being the ceramic of claim 2.

4. In an electrical device containing a semiconducting ceramic having a positive rush breakdown voltage, the improvement which comprises said ceramic being the ceramic of claim 1.

* * * * *